Feb. 17, 1953  R. W. BARRETT  2,628,691
SELF-SERVICE STORE
Filed June 5, 1948  3 Sheets-Sheet 2
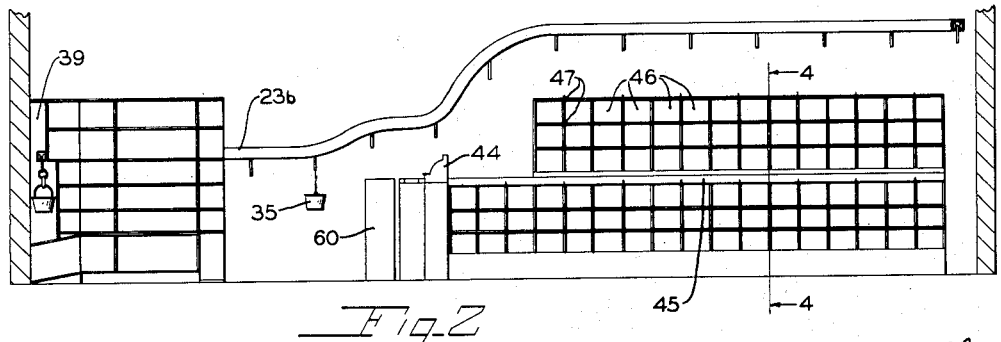
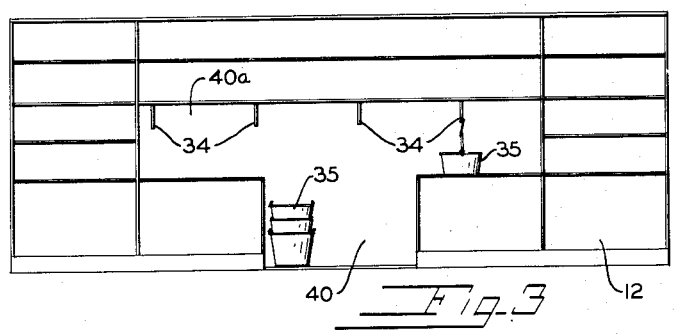
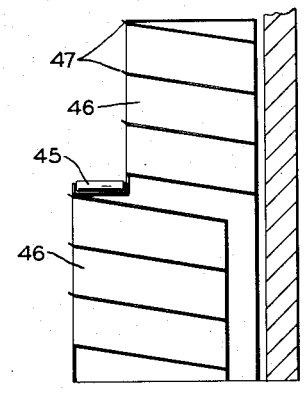
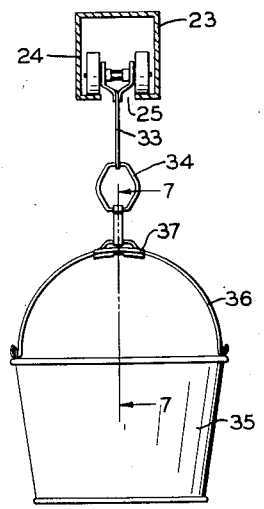
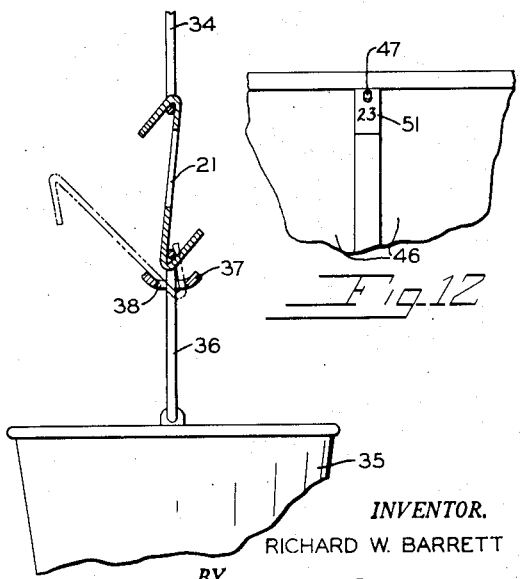
INVENTOR.
RICHARD W. BARRETT
BY Clarence B. DesJardins
HIS ATTORNEY Feb. 17, 1953        R. W. BARRETT        2,628,691
SELF-SERVICE STORE
Filed June 5, 1948                                        3 Sheets-Sheet 3
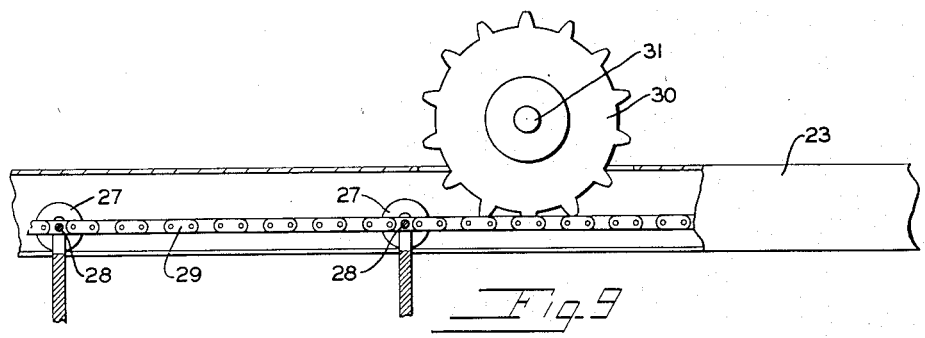
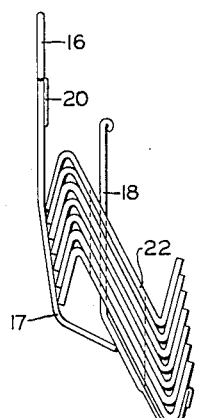
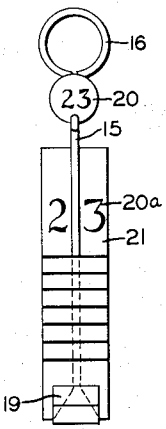
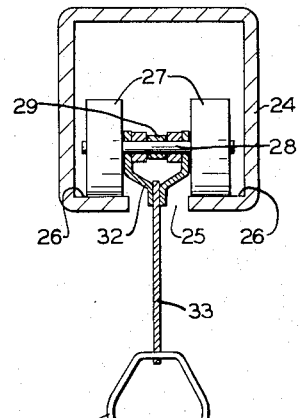
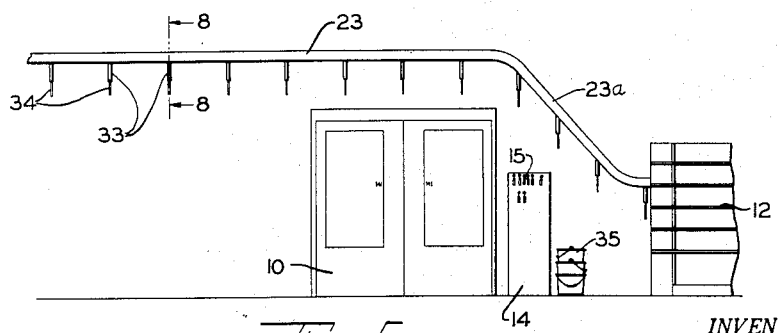
*INVENTOR.*
RICHARD W. BARRETT
BY Clarence B. Desjardins
HIS ATTORNEY Patented Feb. 17, 1953

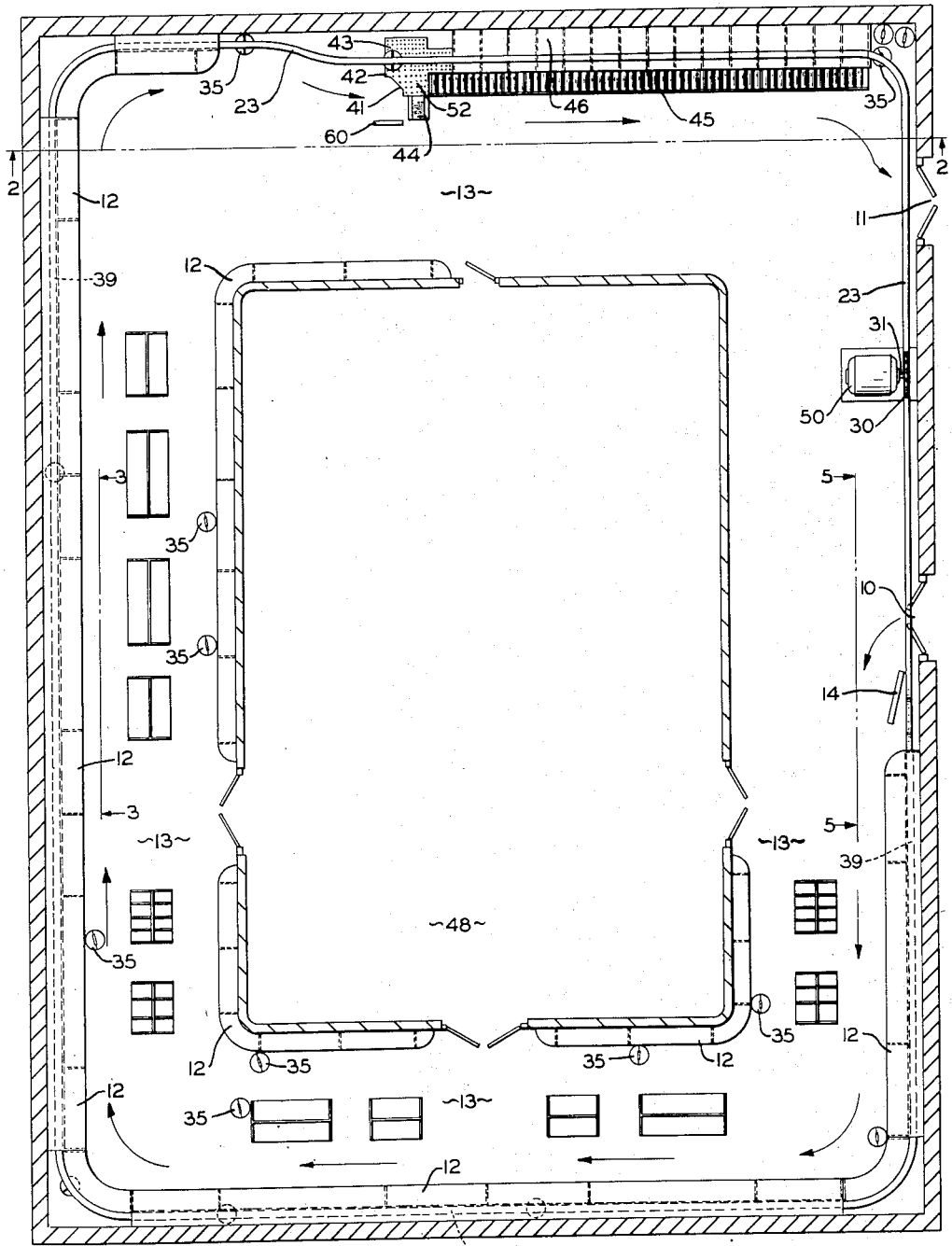

2,628,691

UNITED STATES PATENT OFFICE 2,628,691

SELF-SERVICE STORE

Richard W. Barrett, Cincinnati, Ohio

Application June 5, 1948, Serial No. 31,230

1 Claim. (Cl. 186—1)

This invention relates to a Self-Service Store, for vending merchandise, in which the customer helps himself or herself independently of aid by a clerk or salesman, and more particularly pertains to an improved store of the self-service type in which the merchandise is carried by conveyor means to a settlement station after it is selected.

The increasing popularity of self-service stores has given rise to the problem of allowing the customer to leave the store, in the shortest possible time after selection of the merchandise.

In the self-service store at the present time there is a considerable delay at the settlement counter because each entire group of items must be checked and then priced and given to the customer after payment. This operation often requires the purchaser to stand near the settlement station and wait in line while those preceding him have their orders checked and priced. The additional space required in allowing the customers to wait in line could be utilized for merchandising. Consequently, valuable space as well as time is consumed.

Moreover, in the self-service store at the present time it is necessary to have storage space for a large number of carriers, such as carts, which are utilized by the purchaser in bringing the selected articles to the settlement station.

Also, at the present, valuable floor space is taken up by the carriers or carts in transit around the store.

It is, therefore, the principal object of my invention to provide a self-service store wherein there is a continuous checking and accumulation of articles, while the customer is selecting them, so the customer can pay his bill and leave the store soon after making his final selection, without having to wait any considerable time for checking and settlement.

Another object of my invention is to provide a self-service store wherein the articles are selected by a customer and placed in a container which is automatically carried to the settlement counter to await the customer's arrival, and wherein successive articles selected by the customer are successively carried to the counter so that, after the selections are completed, the customer walks to the settlement counter, makes payment and receives his or her purchases.

Another object of my invention is to provide a self-service store wherein the selling area is enlarged because of the diminished floor space occupied by carts in transit or by carts in storage or by lines of customers awaiting checking and settlement at counters.

A further object of the invention is to simplify the operations at the settlement station and make the frequency thereof more constant, so that fewer cashiers or settlement clerks are required to take care of the load of transactions, thus ultimately reducing labor costs.

A further object of my invention is to provide for identification of the selections which have been made and sent ahead to the settlement counter.

A specific object of my invention is to provide article conveyor apparatus with devices for attaching carriers to a conveyor so each carrier is identified by indicia on the attaching device, and without which attaching device the carriers may not be attached to the conveyor. Thus a positive identification means for each article or group of articles is provided which cannot be disrupted through inadvertence or error on the part of the customer.

Further objects, and objects relating to details of construction and economies of operation, will definitely appear from the detailed description to follow. In one instance, I have accomplished the objects of my invention by the devices and means described in the following specification. My invention is clearly defined and pointed out in the appended claim. A structure constituting a preferred embodiment of my invention is illustrated in the accompanying drawings, forming a part of this specification, in which:

Fig. 1 shows a plan view of a self-service store embodying the invention in its preferred form.

Fig. 2 is a detail, sectional view taken along the line 2—2 of Fig. 1.

Fig. 3 is a view in front elevation of one of the loading stations of my store, taken along the line 3—3 of Fig. 1.

Fig. 4 is a detail, sectional view taken along the line 4—4 of Fig. 2.

Fig. 5 is a view in front elevation of the entrance station, taken along the line 5—5 of Fig. 1.

Fig. 6 is an enlarged, detail, sectional view of one of the buckets shown attached to the conveyor.

Fig. 7 is a detail, sectional view taken along the line 7—7 of Fig. 6.

Fig. 8 is an enlarged, detail, sectional view taken along the line 8—8 of Fig. 5.

Fig. 9 is a view of the driving mechanism for the conveyor.

Fig. 10 is a front view of one of the hook member groups.

Fig. 11 is a view in side elevation of the device shown in Fig. 10.

Fig. 12 is an enlarged view of a portion of a pair of the bins showing the identifying label for said bins.

In a preferred form of my invention, which, for purposes of illustration, is shown embodied in a retail store of the self-service type, there is provided a continuous conveyor which extends in the direction of the aisles. The aisles are formed by a plurality of display cabinets disposed around the store from an entrance station to an exit station. A plurality of buckets or article carriers are distributed in the aisles throughout the store, into which selected articles may be deposited. At the entrance station a board may be provided for holding a plurality of carrier-conveyor attaching devices grouped into units and carried by a holder. The hook members for attaching the carriers to the conveyor have identifying indicia and are arranged in groups for selection by customers. Each of the hooks in a group bears the same indicia.

As the customer enters the store he selects one of the units, and takes it by means of the holder along on his selection tour. Each of the carrier-conveyor attaching devices has identification indicia which corresponds with the indicia on the holder. After having selected one or more articles the customer places them in a bucket, attaches one of the carrier-conveyor attaching devices to the bucket and attaches the other end of the device to the conveyor. The customer repeats this operation as often as necessary. The bucket, or buckets, are then carried around the store by the conveyor at a controlled speed somewhat in excess of walking speed to a settlement counter which is provided near the exit station.

At the settlement station, the bucket with the attaching device is removed from the conveyor. Bins are provided at the settlement station which are labeled to correspond with the indicia on the selected attaching devices and unit holder. A clerk lists and prices the items and he, or another clerk, places them in a bin reserved for the customer having the selected identifying mark. This may be done while the customer is selecting other purchases. Thus, when the customer reaches the settlement station the articles have been priced and grouped, so that all that remains is for the customer to make payment and receive the selected merchandise. This results in a considerable saving of time, inasmuch as the customer does not have to stand in line to await checking.

Fig. 1 shows a plan view of a self-service store embodying the invention in its preferred form. This store may be rectangular in shape and provided with an entrance station 10 and exit station 11. A plurality of display cabinets 12 are disposed around the store to form aisles or passageways 13 through which the customers pass, preferably in the direction as indicated by the arrows in Fig. 1.

Near the entrance station 10, I provide a board 14 on which are positioned a plurality of unit holders 15. The unit holders 15 (Figs. 10 and 11) comprise an eye 16 and a bent portion 17 to which is welded a hook holding member 18 having a cradle portion 19. An identifying mark 20 is fixed to the carrier 15 near the eye 16. A plurality of S hooks 21 are carried by holder 15. The S hooks are relatively wide and have an opening 22 whereby they may be slipped over the member 18, the lower part of the first hook resting in the cradle 19 and the succeeding hook resting in the cradle formed by the curved end of the preceding hook. Each of the hooks has an identifying mark 20a which corresponds with the mark 20 on the holder.

Along the aisles or passageways 13, I provide a conveyor indicated generally as 23, which is adapted to continually move around the store in the same direction indicated by arrows. The conveyor 23 moves over the entrance 10, and then bends downwardly as at 23a (Fig. 5) to enter passageway 39 formed behind the display cabinets. On leaving the last display cabinet it moves upwardly, as at 23b (Fig. 2), and passes over the settlement counter and storage bins and then goes on to the entrance station. The conveyor comprises a casing 24 rectangular in cross section, having an opening in the bottom portion 25. On opposite sides of the opening are track-like surfaces 26—26 on the bottom portion of casing 24 along which rollers 27, mounted on an axle 28, are moved. The rollers are spaced longitudinally on chain 29, which is driven by a sprocket 30, driven by a suitable driving shaft 31 attached to the armature of a driving motor 50. A yoke 32 is secured to the axle 28 and has depending therefrom a carrying member 33 on which is mounted hook-receiving ring 34 adapted to receive an end of one of the S hooks 21.

To carry the selected items of merchandise on the conveyor to the settlement station, I provide carriers which may be in the form of buckets such as bucket 35, and which may be attached to the conveyor. Each bucket has a bail 36 with hook-supporting member 37 extending across the bail beneath its uppermost portion. The hook-supporting members are each formed with an opening 38 for receiving one end of an S hook 21. The opening is large enough to permit the bottom of the hook 21 to be inserted therein, but small enough to hold the hook in a substantially upright position (Fig. 7) so that the customer may hold the bucket by the bail 36 and attach the upper end of the hook to one of the moving conveyor rings 34. The hook supporting member 37 may be so shaped as to form a comfortable handgrip on the bail of the bucket. Thus, the customer carrying a holder with a group of hooks 21 in one hand, may move around the store, select an article, place it in a bucket 35, and with the other hand place a hook on the hook-supporting member and attach the bucket and hook to a ring 34 on the conveyor 23. Buckets can only be attached to the conveyor by using one of the hooks 21, so all buckets on the conveyor will be identified with particular customers.

I prefer to place the conveyor in the passageway 39 behind the display counters 12 (Figs. 2 and 3). The conveyor casing 24 is secured on the rear of the display cabinets and the carriers travel behind the cabinets. To attach the carriers to the conveyor, I have provided loading stations, such as 40, which are spaced around the store. The loading stations have openings, such as 40a, where the customer has access to the conveyor, and at these points the customer may attach the bucket 35 containing the selected articles to the conveyor rings 34. After the bucket 35 has been attached to the conveyor it moves at a speed slightly in excess of walking speed to the settlement counter 41. At the settlement counter which has an unloading station 42, there may be an anti-friction surfaced counter 43 on which the buckets 35 are received. In one form, the anti-friction surfaced counter may be provided with balls 52 on its surface so that a carrier can be moved in any direction on the surface with ease.

The items in the buckets are tabulated and appropriate entries are made in a listing machine or cash register 44, the entries being identified with the particular identifying mark 20a which is attached to the bucket 35. The tabulation sheets from the register are placed on a rack 60 in slots or on pegs having indicia corresponding to the particular identifying mark. They are totaled and the customer makes payment after the final tabulation. The buckets are then moved along a roller conveyor 45 with the carrier-conveyor attaching device, having the identifying indicia still attached. An operator places the contents of the bucket 35 into a bin, such as bin 46 according to the identifying indicia on the label 51 which corresponds with the indicia on the bucket. Two bins are provided for each of the carrier-conveyor attaching groups. The hook 21 having the identifying indicia 20a is removed from the bucket and hung on another holder or a peg 47. After the customer arrives at the settlement station the hooks which have been collected on the peg and the hooks remaining in the customer's possession are again positioned on the holder 15 and returned to the board 14 for re-use. The customer goes to the settlement counter to make payment and is handed the purchases. The customer then leaves by the exit station 11.

I have provided a room 48 in the center of the store having display cabinets along its outside walls. This room may be used for storage or other purposes, for example, it may be used as an auditorium where classes in cooking may be conducted, or where radio broadcasts may be made, or this part of the store may be set aside where children may be cared for while the parent makes merchandise selections. If desired, this space could be used for departments of the store to which the self-service principle is not applicable, and, in some cases, the conveyor might be extended into this space to serve it.

I am aware that the particular invention described herein is susceptible of considerable variation without departing from the spirit of my invention, and, therefore, I claim my invention broadly as indicated by the appended claim.

Having thus described my invention, what I claim as new and useful and desire to secure by United States Letters Patent, is:

In a self-service store having a plurality of display cabinets for merchandise, a merchandise collecting, transporting and accumulating apparatus comprising the combination of a continuous conveyor, a plurality of hook-receiving rings spaced longitudinally on said conveyor, a plurality of carriers, a hook-receiving member on each of said carriers, said hook-receiving rings and hook-receiving members being nonengageable with one another, S-hooks attachable to said hook-receiving rings and hook-receiving members for supporting said carriers on said conveyor, said S-hooks having customer identifying indicia thereon, whereby a carrier can only be affixed to the conveyor by use of an S-hook bearing customer identifying indicia, and each carrier is identified with a particular customer by means of the S-hook attached thereto.

RICHARD W. BARRETT.

REFERENCES CITED

The following references are of record in the file of this patent:

UNITED STATES PATENTS

| Number | Name | Date |
| --- | --- | --- |
| 1,477,495 | Hutchison | Dec. 11, 1923 |
| 1,544,949 | Smiley | July 7, 1925 |
| 1,720,690 | Preble | July 16, 1929 |
| 1,788,759 | Anderson | Jan. 13, 1931 |
| 1,832,547 | Hall | Nov. 17, 1931 |
| 1,839,617 | Tiffany | Jan. 5, 1932 |
| 2,235,941 | Montgomery | Mar. 25, 1941 |
| 2,355,708 | Delucchi et al. | Aug. 15, 1944 |
| 2,456,224 | Sullivan | Dec. 14, 1948 |

OTHER REFERENCES

Factory and Industrial Management, August 1928, pages 260, 261 and 262. (In Div. 28 in 186/1.)